Oct. 17, 1933.                F. KEIDEL                1,930,560
                                SEAL
                          Filed Feb. 18, 1933
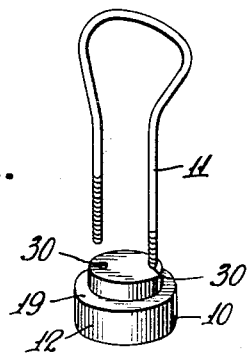
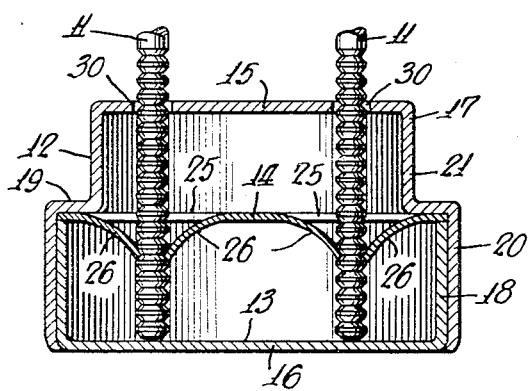
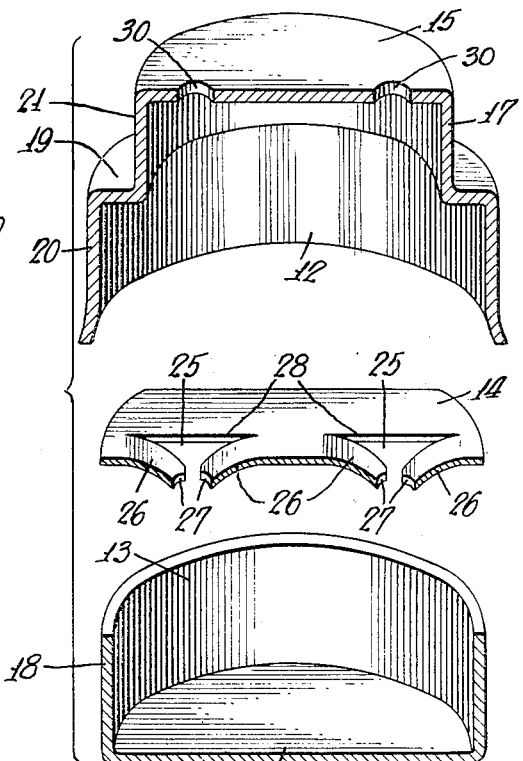
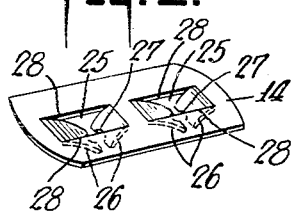
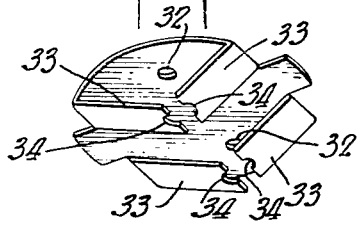
INVENTOR
*Frank Keidel*
BY
ATTORNEYS Patented Oct. 17, 1933

1,930,560

UNITED STATES PATENT OFFICE 1,930,560

SEAL

Frank Keidel, Elmhurst, N. Y., assignor to The International Seal and Knot Protector Co., New York, N. Y., a corporation of New York Application February 18, 1933. Serial No. 657,373

9 Claims. (Cl. 292—318)

This invention relates to that type of seal which includes a shackle, and a seal body for receiving the ends of said shackle, and retaining them therein in locked position.

One object of the present invention is to produce a seal of the class described, which is of simple and inexpensive construction; which can be assembled very easily; and which, when completed, encloses the ends of the shackle in a seal body in such a way that they cannot be withdrawn therefrom without breaking or mutilating the parts, thus affording evidence of tampering.

As an important feature of the present invention, the seal body which locks the ends of the shackle, includes a pair of cup-like members telescoped to form a casing, and interlocked through the frictional engagement of their peripheral walls, and a locking plate entirely enclosed in said casing. The shackle is preferably in the form of a wire, and the locking plate is so constructed as to permit the wire to pass therethrough in one direction, and to lock the wire from withdrawal in the opposite direction.

The members of the seal body are all shaped as to permit them to be formed from sheet metal by simple stamping and punching operations, so that said seal body may be made at very low cost.

As an important feature of the present invention, the locking plate is spaced a substantial distance from the end walls of the casing formed by the telescoped cup-like members, and is clamped in place by said members. By means of this construction, the seal is made tamperproof. Since the ends of the wire are entirely enclosed in the casing when the seal is complete, and since no means of access to the interior of the casing is permitted, except through the apertures through which the wire passes, it is not possible to cut off the wire close to the seal body and reuse the same shackle with the same casing, because the remaining stub piece of the wire will remain in the casing and in locking engagement with the locking plate. The cut off end of the wire cannot be pulled out as access thereto cannot be obtained, and it cannot be pushed out as it abuts the end wall of the casing.

In the accompanying drawing, there are shown for the purpose of illustration, two forms embodying the present invention.

In the drawing:

Fig. 1 shows a perspective of a seal ready to be snapped into locked position.

Fig. 2 is a section on a greatly enlarged scale taken through the seal body, and showing the ends of the wire in locked position.

Fig. 3 is a perspective, in section, of the seal body, with the elements thereof shown in separated positions.

Fig. 4 is a perspective of one form of locking plate, and

Fig. 5 is a perspective of another form of locking plate.

In Fig. 1, the seal body 10 is shown with one end of the shackle 11 held therein, and the other end in position to be moved into locking position to complete the seal.

In the specific form shown, the seal body 10 includes a pair of cup-like members 12 and 13 telescoped to form a casing and interlocked through frictional engagement of their peripheral walls. Secured in said casing is a locking member 14 for engaging at least one end of the shackle 11, and preventing said end from being withdrawn from the interior of said casing after the sealing has been effected. This member 14 is advantageously in the form of a locking plate clamped between the two cup-like members 12 and 13 and spaced a substantial distance from the end walls of the casing formed by the two members 12 and 13.

The cup-like members 12 and 13 are preferably made of thin metal, and preferably stamped or drawn into shape to provide end walls 15 and 16 respectively, and peripheral walls 17 and 18 respectively oval or cylindrical in shape. In order to clamp the locking plate 14 in spaced relationship with respect to the ends of the casing, the member 12 is formed with a shoulder 19 which divides the peripheral wall 17 into two sections 20 and 21. The locking plate 14 seats upon the shoulder 19, and is clamped between said shoulder and the end of the peripheral wall of the member 13.

In order that the two cup-like members 12 and 13 may be firmly gripped in telescoped frictional engagement, the outside diameter of the peripheral wall 18 is equal to the inner diameter of the cylindrical section 20. The depth of the cup-like member 13 is such that the end wall 16 thereof, when said member is telescoped into the member 12 into the position shown in Fig. 2, will not extend to any substantial distance beyond the peripheral edge of the member 12, so that no portion of said member 13 may be gripped to pull it out of the member 12. The two members 12 and 13 have a very tight frictional fit, so that in assembling, they must be forced into telescopic position. The open end of the member 12 may be slightly flared outwardly to facilitate entry of the member 13 into said member 12. If desired, the edge of the peripheral wall 20 may be curved slightly inwardly by the assembling press to aid in preventing any portion of the member 13 from being gripped and pulled out of the member 12. This inward curving or flanging of the peripheral wall 20 is not essential if the end wall 16 does not extend beyond the peripheral edge of the member 12.

The locking member 14, in the form shown in Fig. 4, comprises a thin plate preferably of spring steel, and having a pair of spaced apertures 25 through which the ends of the shackle 11 may pass.

In order to lock the shackle 11 to the locking plate, each aperture 25 has cooperating therewith tongues 26 struck out from the plate, and extending in position to permit the insertion of the shackle through the apertures 25 in one direction, but which bite into the surfaces of the shackle when it is pulled in the opposite direction, to prevent withdrawal thereof. In the construction shown in Fig. 4, two tongues 26 are provided for each aperture 25, and each tongue advantageously has a semi-circular notch 27. These tongues 26 and apertures 25 may be formed by a stamping and punching operation which includes punching apertures which form the semi-circular notches 27, effecting two cuts along the lines 28, cutting the material between these two lines through the centers of the apertures which form the notches 27 so as to form the tongues 26, and forcing these tongues into inclined positions shown in Figs. 2 and 4. It is seen that the operation of forming these locking plates is a very simple and inexpensive one.

In the construction shown in Figs. 1 to 4, the ends of the wire 11 are inserted into the interior of the casing through apertures 30 in the end wall 15 of the cup-like member 12, and are forced through the apertures 25 past the tongues 26. If the wire is pulled in the opposite direction, the free ends of the tongues 26 will engage the wire and prevent withdrawal thereof. In order to further aid in preventing the withdrawal of the ends of the wire 11 from locking engagement with the plate 14, these ends are preferably corrugated, notched, or roughened.

In order to insure the proper placing of the plate 14 with its apertures 25 in alignment with the apertures 30, the two members 12 and 13 are not cylindrical in cross-section but are preferably more or less oval or elliptical, and the length of the plate 14 is substantially equal to the maximum internal diameter of the section 20.

The seal may be sold in the form shown in Fig. 1, with one end of the wire locked in position, so that the only operation necessary to complete the seal is the insertion of the other end of the wire through the part to be sealed and then into the casing, and into locked position in the locking plate 14.

The frictional engagement between the two cup-like members 12 and 13 is such that no pressure whatever transmitted to the member 13 by pushing the wire 11 into the casing will separate the two members, since the amount of force that can be exerted on the wire without buckling, is less than the force required to overcome the frictional grip between the members.

In Fig. 5 is shown another form of locking plate which likewise may be easily formed from a single thin sheet of spring steel. This plate is provided with a pair of apertures 32 adapted to receive the wire, and is formed with extensions bent to form tongues 33. These tongues may be provided at their free ends with semi-circular notches 34 for receiving the wires, and permit the slippage of the wire past them in one direction, but engage the wire to prevent withdrawal in the opposite direction.

By entirely enclosing the ends of the wire in the casing, with no means of access to the interior thereof, the seal is rendered tamper-proof. Furthermore, by locking the two ends of the wire to a single locking plate in the interior of the casing, the construction of the seal body is simplified. Also, since the locking plate is spaced from the ends of the casing which encloses it, if the wire should be cut very close to the seal body, the stub piece of the wire remaining in the casing could not be extruded from locking engagement with the locking plate. In order to insure against pushing any such stub wire from engagement with the locking plate, the ends of the wire should be close to the end wall 16 when the seal is complete. The engagement of these wire ends with the end wall 16 will prevent any stub wires from being pushed out of the plate 14.

By spacing the locking plate 14 from the end wall 15, if the apertures in the locking plate are slightly out of alignment with the apertures in said end wall, this will not be of any serious consequence since enough space is afforded between said locking plate and said end wall to permit the insertion of the ends of the wire at an angle with respect to said wall.

Having thus described my invention, what I claim as new and desire to secure by Letters Patent is:—

1. A seal including a shackle, and a seal body including a pair of thin metal cup-like members having end and peripheral walls, the outer diameter of the peripheral wall of one of said members being substantially equal to the inner diameter of the peripheral wall of the other member, said members being telescoped to form a casing, and having their peripheral walls in snug frictional engagement, and a plate in said casing for locking the ends of the shackle in said casing, said plate and one of said end walls each having a pair of apertures to receive the ends of said shackle.

2. A sealing device of the class described, including a shackle, and a seal body including a pair of sheet metal cup-like members having end and peripheral walls, and telescoped with the peripheral walls in snug frictional engagement, the peripheral wall of the outer member having an annular shoulder spaced from the ends thereof, and means clamped between said annular shoulder and the peripheral edge of said inner member for locking one end of said shackle within said seal body.

3. A seal including a wire, and a seal body including a pair of cup-like sheet metal members, each having an end and a peripheral wall, the outer diameter of the peripheral wall of one of said members being substantially equal to the inner diameter of the peripheral wall of the other member, said members being telescoped to form a casing, and having their peripheral walls in snug frictional engagement, the inner member being of such length that the end wall thereof does not extend to any substantial distance beyond the open end of the outer member, whereby said inner member cannot be gripped and pulled out of said outer member, and a sheet metal locking plate clamped between said members, spaced from said end walls, and having an aperture for receiving one end of said wire, and tongues in close proximity to said aperture, struck out from said plate, and movable to permit the passage of the wire through said aperture in one direction, but to engage the wire when said wire is pulled in the opposite direction to prevent disengagement of the free end of said wire from said plate.

4. A seal including a wire, and a seal body including a casing formed of a pair of telescoping cup-shaped members, the end wall of one of said members having apertures to receive the ends of said wire, a locking plate in said casing and having a pair of spaced apertures for receiving both ends of the wire therethrough, and tongues adjacent to said apertures and permitting the passage of the wire therethrough in one direction, but acting to bite into said wire to prevent its withdrawal from locking engagement with said plate, the ends of said wire, when in locking position, being entirely enclosed in said casing.

5. A seal body formed of two telescoped sheet metal cups in snug frictional engagement, and forming a closed casing, the outer cup having a shoulder intermediate of the ends of its peripheral wall, and opposite to the inner end of the inner cup, and a locking plate clamped within said casing between said shoulder and said inner end of the inner cup, the end of the outer cup and said locking plate having aligned openings to receive the ends of a shackle, and said locking plate having means for preventing the withdrawal of said shackle ends.

6. A seal body formed of two telescoped sheet metal cups in snug frictional engagement, and forming a closed casing, the outer cup having a shoulder intermediate of the ends of the peripheral wall, and opposite to the inner end of the inner cup, and a locking plate clamped within said casing between said shoulder and said inner end of the inner cup, the end of the outer cup and said locking plate having aligned openings, and a wire having its end portions provided with roughened surfaces and adapted to be projected into said casing through said aligned openings, said locking plate having means for preventing the withdrawal of said wire ends.

7. A seal including a wire, and a seal body connected to one end of said wire, and including a pair of cup-like members, each having an end and a peripheral wall, the outer diameter of the peripheral wall of one of said members being substantially equal to the inner diameter of the peripheral wall of the other member, said members being telescoped to form a casing, and having their peripheral walls in snug frictional engagement, and a locking plate clamped between said members for locking the other end of the wire in said casing, said plate being formed from sheet metal, and including a pair of tongues struck out from said plate, and forming an aperture, said tongues extending from the ends of said aperture in inclined position with respect to the main portion of the plate, and permitting the wire to pass through said aperture in one direction, but engaging the surface of the wire to prevent its withdrawal in the opposite direction.

8. A seal body including a pair of cup-like members having end and peripheral walls of thin metal, the outer diameter of the peripheral wall of one of said members being substantially equal to the inner diameter of the peripheral wall of the other member, said members being telescoped to form a casing, and having their peripheral walls in snug frictional engagement, and a locking plate clamped between said members, formed from a single piece of sheet metal, and having an aperture therethrough, and a pair of tongues extending from opposite sides of the plate, bent over in inclined position with respect to the main portion of said plate, and having the free edges thereof spaced from said aperture but close thereto, said tongues permitting the passage of a wire through said aperture in one direction, but engaging the surface of the wire to prevent withdrawal of said wire in the opposite direction.

9. A seal body including a pair of cup-like members, each having a substantial elliptical end wall and a peripheral wall, one of said members being adapted to fit friction-tight within the other member to form a casing, the end wall of one of said members having a pair of openings therein along the major diameter, and a locking plate clamped between said members and having its body portion spaced from both of said end walls, said plate having a pair of apertures in alignment with said first mentioned apertures, and having tongues adapted to engage the ends of a wire extending through said first mentioned and said second mentioned apertures and prevent the withdrawal of said wire.

FRANK KEIDEL.